United States Patent
Lee et al.

(10) Patent No.: US 6,491,738 B1
(45) Date of Patent: Dec. 10, 2002

(54) 2-STAGE FLUIDIZED BED TYPE FINE IRON ORE REDUCING APPARATUS, AND REDUCING METHOD USING THE APPARATUS

(75) Inventors: Il Ock Lee, Pohang-si (KR); Hang Goo Kim, Pohang-si (KR); Uoo Chang Jung, Pohang-si (KR); Nag Joon Choi, Pohang-si (KR)

(73) Assignees: Pohang Iron & Steel Co., Ltd. (KR); Research Institute of Industrial Science & Technology (KR); Voest-Alpine Industrieanlagenbau GmbH, Linz (AT)

( * ) Notice: Subject to any disclaimer, the term of this patent is extended or adjusted under 35 U.S.C. 154(b) by 0 days.

(21) Appl. No.: 09/763,299
(22) PCT Filed: Jun. 21, 1999
(86) PCT No.: PCT/KR99/00325
§ 371 (c)(1),
(2), (4) Date: Feb. 20, 2001
(87) PCT Pub. No.: WO00/79013
PCT Pub. Date: Dec. 28, 2000

(51) Int. Cl.⁷ .............................. C21B 13/14; C22B 5/14
(52) U.S. Cl. ......................... 75/446; 75/450; 266/172; 266/156; 266/157
(58) Field of Search ................... 75/446, 450; 260/172, 260/156, 157

(56) References Cited

U.S. PATENT DOCUMENTS 5,762,681 A  *  6/1998  Lee et al. ..................... 75/446

FOREIGN PATENT DOCUMENTS

| JP | 58-217615 A2 | 6/1982 |
| KR | 117065 B1 | 3/1997 |
| WO | WO 96/21045 A1 | 7/1996 |
| WO | WO 97/24463 A1 | 7/1997 |

* cited by examiner

Primary Examiner—Melvyn Andrews
(74) Attorney, Agent, or Firm—Webb Ziesenheim Logsdon Orkin & Hanson, P.C.

(57) ABSTRACT

A two-stage fluidized bed reducing apparatus and a reducing method for fine iron ore of a wide particle size distribution with an increased degree of utilization of the reducing gas. Fine iron particles dropping through the holes of a gas distributor can be recycled into the fluidized bed furnace, thereby preventing an impediment of the reducing gas flow due to abnormal defluidizing or channeling. A first fluidized bed furnace dries, pre-heats and pre-reduces the fine iron ore, and a second fluidized bed furnace finally reduces the pre-reduced iron ore. Downstream of the respective fluidized beds are installed intermediate hoppers and gas/solid sealing valves. Thus, the fine iron ore particles which drop through the holes of gas distributors during the abnormal operation are recycled to the furnaces. Accordingly, the gas flow is not impeded.

12 Claims, 3 Drawing Sheets

PRIOR ART

PRIOR ART

2-STAGE FLUIDIZED BED TYPE FINE IRON ORE REDUCING APPARATUS, AND REDUCING METHOD USING THE APPARATUS

FIELD OF THE INVENTION

The present invention relates to a 2-stage fluidized bed fine iron ore reducing apparatus and a reducing method using the apparatus, for reducing a fine iron ore of a wide particle size distribution. More specifically, the present invention relates to a 2-stage fluidized bed fine iron ore reducing apparatus and a reducing method using the apparatus, in which a fine iron ore of a wide particle size distribution can be reduced in an economical and efficient manner, and impediment of the reducing gas flow due to the abnormal phenomena such as defluidizing and channeling can be effectively avoided during the operation.

BACKGROUND OF THE INVENTION

In the conventional blast furnace method, the size of solid particles are very large, and therefore, the iron ore can be reduced within a fixed bed type furnace. However, in the case of a fine particle iron ore, if the gas velocity is low as in the fixed bed type furnace, low gas permeability and the sticking phenomenon occur, with the result that the operation may be halted. Therefore, a fluidized bed type method has to be necessarily adopted, so that the movements of solid particles can be made brisk with excellent gas permeability.

An example of the fluidized bed type furnace is disclosed in Japanese Utility Model Publication No. Sho-58-217615. This is illustrated in FIG. 1. As shown in FIG. 1, this furnace includes a cylindrical reducing furnace 91 and a cyclone 95. The reducing furnace 91 is provided with a raw iron ore feeding hole 92, a high temperature reducing gas injecting hole 93, and a reduced iron discharge hole 94. Further, in the lower portion of the reducing furnace, there is disposed a gas distributor 96. A reducing gas is supplied through the gas distributor 96, and a fine iron ore is supplied through the feeding hole 92. Then the reducing furnace is agitated, so that the fine iron ore and the reducing gas can be mixed so as for the iron ore to be reduced in a fluidized state. After the elapsing of a time period, if the fluidized bed rises up to the height of the discharge hole 94, then the reduced iron is discharged through the discharge hole 94. Here, the fluidized bed takes the form of a bubbling fluidized bed in which the reducing gas forms bubblings, and the bubblings grow while passing through the particle layer.

In the above described reducing furnace, however, in view of the productivity and economy, if the elutriation loss of the fine iron ore particles is to be diminished, if the gas consumption rate is to be minimized, and if the gas utilization degree is to be maximized, then the particle sizes of the raw iron ore particles have to be strictly limited. Accordingly, a fine iron ore having a wide particle size distribution cannot be handled. That is, the above described fluidized bed type furnace cannot treat an iron ore of a wide particle size distribution, but can use only 0–0.5 mm, 0.5–1 mm, 1–2 mm and the like. However, the actually available fine iron ore particles have a size of 8 mm or less. Therefore, if the naturally available fine iron ore is to be used, the fine iron ore has to be sorted by sieving, or it has to be crushed into the rated sizes. The result is that the productivity is lowered, and the production cost is increased, because it requires additional process steps and additional facilities.

In an effort to solve this problem, Korean Patent No. 117065 (1997) proposes a 3-stage fluidized bed type reducing apparatus having tapered furnaces as shown in FIG. 2. In this apparatus, a stable fluidizing of an iron ore of a wide particle size distribution is aimed at, and for this purpose, tapered furnaces are employed. Further, in order to improve the reduction rate and the gas utilization rate, first the iron ore is pre-heated, second pre-reduced and then finally reduced, thereby forming a 3-stage reducing process. That is, as shown in FIG. 2, an upper reaction vessel 10 pre-heats the iron ore in a bubbling fluidizing state. A middle reaction vessel 20 pre-reduces the iron ore in a bubbling fluidizing state. A lower reaction vessel 30 finally reduces the pre-reduced iron ore in a bubbling fluidizing state, thereby completing a continuous 3-stage fluidized bed type process.

In FIG. 2, reference codes 40, 50 and 60 indicate cyclones, reference code 70 indicates a hopper, and 80 indicates a melter-gasifier.

In this 3-stage tapered fluidized bed type reducing furnace, an iron ore of a wide particle size distribution can be stably fluidized, and the reduction degree and the gas utilization degree can be considerably improved, compared with the conventional single type cylindrical fluidized bed type furnace. However, this furnace employs 3 stages, and therefore, the facility cost is very high. Further, if a problem occurs in any one of the plurality of the reaction vessels, then other reaction vessels are affected, with the result that the total process is adversely affected. Thus if an abnormal phenomenon such as defluidizing or channelling occurs which is actually very frequent, then the fine iron ore particles drop through the holes of the gas distributor to be agglomerated at the bottom of the reaction chamber. Therefore, the gas flow is impeded, and this cannot be prevented.

SUMMARY OF THE INVENTION

The present invention is intended to overcome the above described disadvantages of the conventional techniques.

Therefore, it is an object of the present invention to provide a 2-stage fluidized bed fine iron ore reducing apparatus, and a reducing method using the apparatus, in which the degree of utilization of the reducing gas is increased, an iron ore of a wide particle size distribution can be reduced in an efficient and economical manner, and fine iron particles dropping through the holes of a gas distributor can be circulated back into the fluidized bed furnace, thereby preventing an impediment of the reducing gas flow due to abnormalities such as defluidizing or channeling.

In achieving the above object, the 2-stage fluidized bed type apparatus for drying, pre-heating and pre-reducing a fine iron ore in a first fluidized bed type furnace, and for finally reducing the fine iron ore (thus pre-reduced) in a second fluidized bed type furnace according to the present invention includes:

a first tapered fluidized bed type furnace for receiving a raw fine iron ore and a reducing gas to form a turbulent or bubbling fluidized bed so as to pre-heat and pre-reduce the raw iron ore;

a first cyclone for separating fine iron ore particles from a discharge gas of the first fluidized bed type furnace to recycle the separated fine iron ore particles into the first fluidized bed type furnace, the separated discharge gas of the first fluidized bed type furnace being discharged to external atmosphere;

a second fluidized bed type furnace for finally reducing the fine iron ore (thus pre-heated and pre-reduced) of the first fluidized bed type furnace, by forming a bubbling or turbulent fluidized bed by utilizing a discharge gas (reducing gas) of a melter-gasifier;

a second cyclone for separating fine iron ore particles from a discharge gas of the second fluidized bed type furnace to recycle the fine iron ore particles into the bottom of the second fluidized bed type furnace, the separated discharge gas of the second fluidized bed type furnace being supplied to the first fluidized bed type furnace as a reducing gas;

a first intermediate hopper positioned between the first and second fluidized bed type furnaces, for storing fine iron ore particles (dropped through the holes of a gas distributor of the first fluidized bed type furnace) to recycle them into the lower portion of the second fluidized bed type furnace; and a second intermediate hopper positioned beneath the second fluidized bed type furnace, for storing fine iron ore particles (dropped through the holes of a gas distributor of the second fluidized bed type furnace) to recycle them into the lower portion of the second fluidized bed type furnace.

In another aspect of the present invention, the method for reducing a fine iron ore by using the above reducing apparatus according to the present invention is characterized in that: a first fluidized bed type furnace dries, pre-heats and pre-reduces the fine iron ore under a reducing atmosphere; a second fluidized bed type furnace finally reduces the pre-reduced fine iron ore; a hopper and a gas/solid particle sealing valve are installed beneath each of the fluidized bed type furnaces; and the fine iron ore particles dropping through the holes of the gas distributors during an abnormality of operation are circulated back into the fluidized bed type furnaces, whereby impediment of the gas flow is avoided.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE INVENTION

Figure 1:
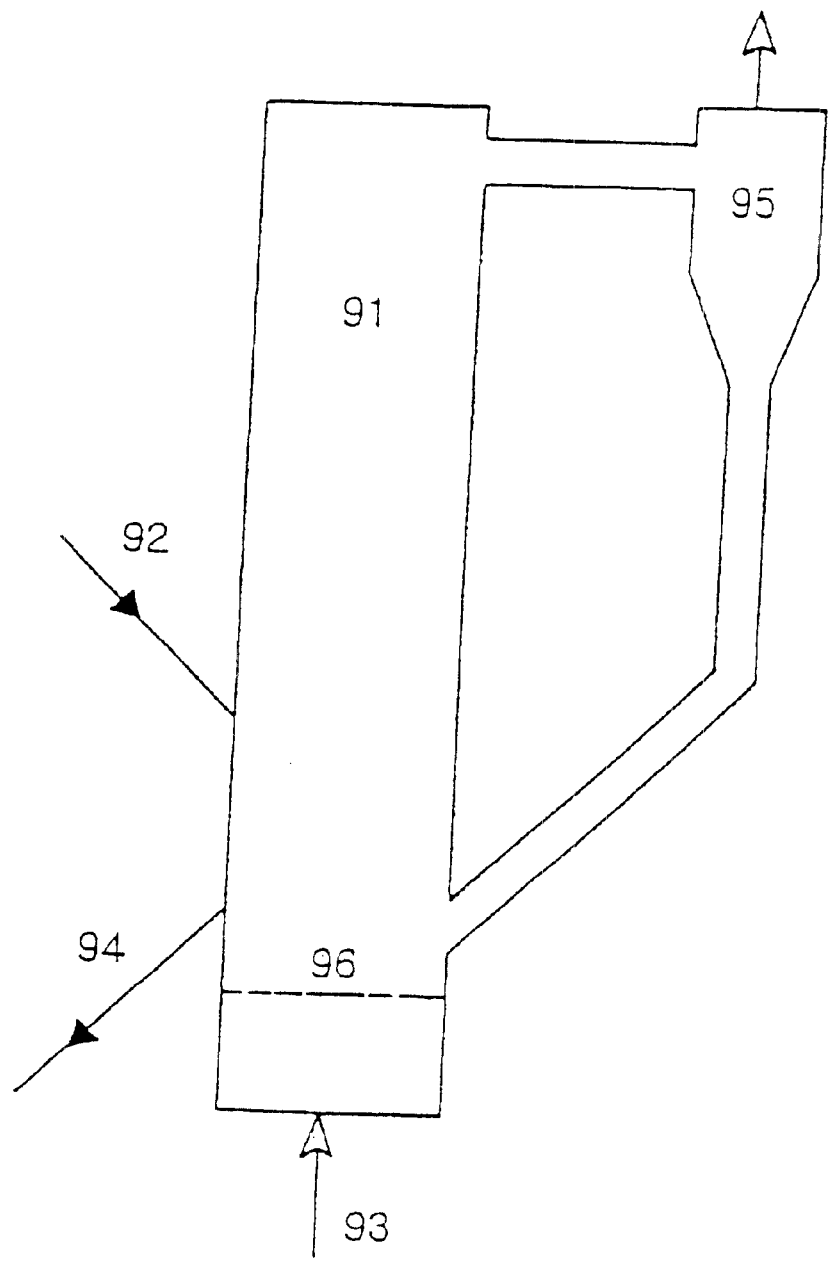
FIG. 1 illustrates a conventional single stage fluidized bed type furnace.
Figure 2:
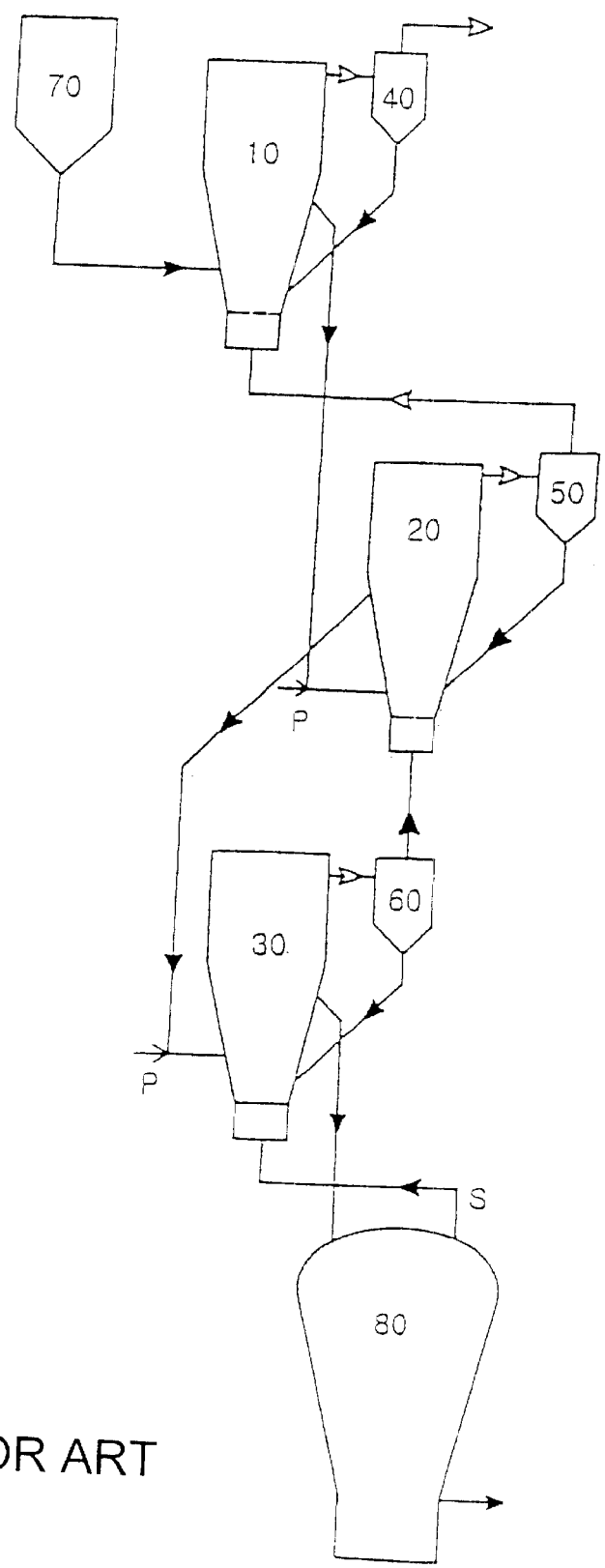
FIG. 2 illustrates the conventional 3-stage fluidized bed type furnace.
Figure 3:
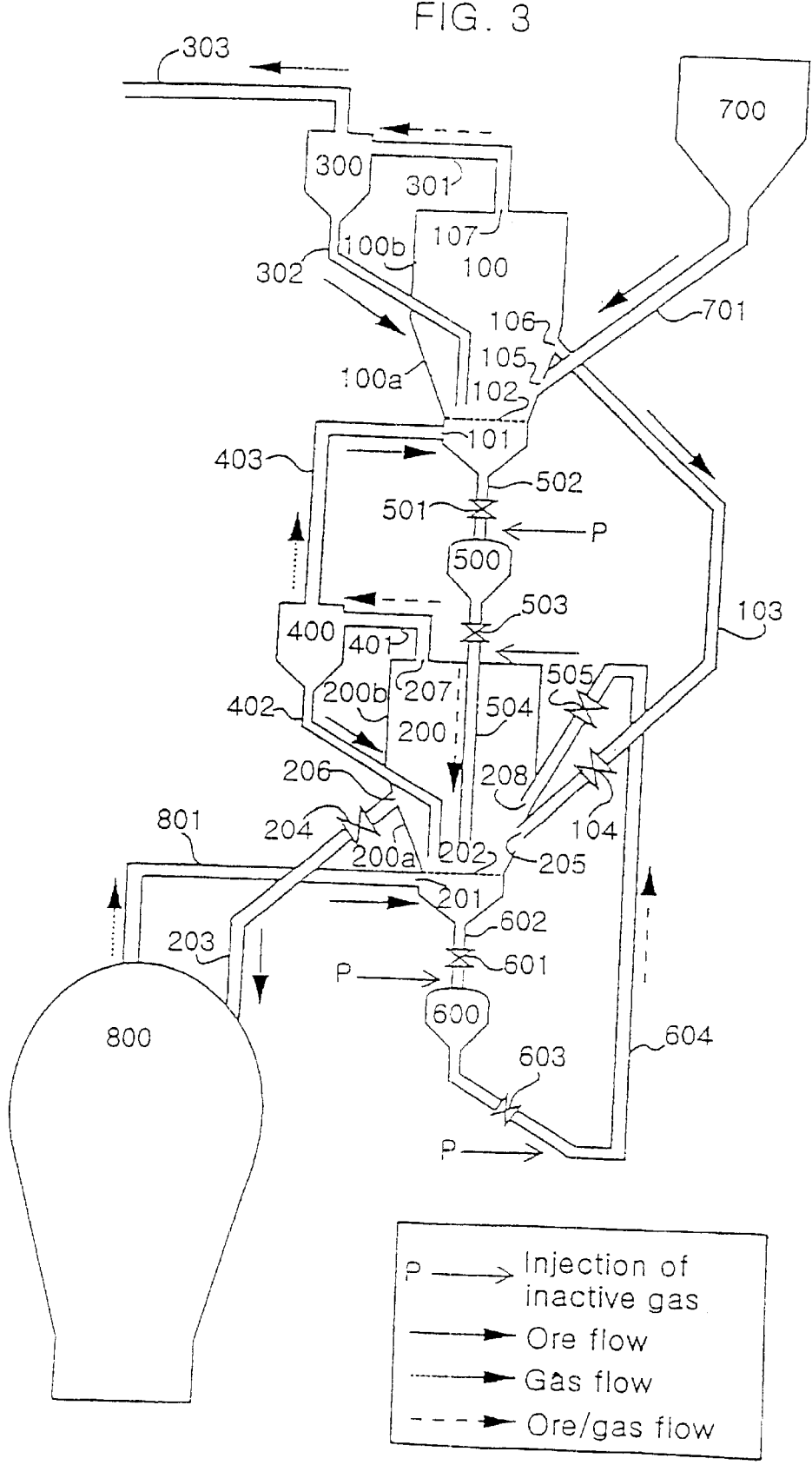
FIG. 3 illustrates the 2-stage fluidized bed type fine iron ore reducing furnace according to the present invention.

As shown in FIG. 3, the 2-stage fluidized bed type fine iron ore reducing apparatus according to the present invention includes:

a first tapered fluidized bed type furnace 100 for receiving raw fine iron ore from a hopper 700 and for receiving a reducing gas to form a turbulent or bubbling fluidized bed so as to pre-heat and pre-reduce the raw iron ore;

a first cyclone 300 for separating fine iron ore particles from a discharge gas of the first fluidized bed type furnace 100 to recycle the fine iron ore particles into the first fluidized bed type furnace 100, the separated discharge gas of the first fluidized bed type furnace being discharged to the external atmosphere;

a second fluidized bed type furnace 200 for finally reducing the fine iron ore (thus pre-heated and pre-reduced) of the first fluidized bed type furnace 100, by forming a bubbling or turbulent fluidized bed by utilizing a discharge gas (reducing gas) of a melter-gasifier 800;

a second cyclone 400 for separating fine iron ore particles from an exhaust gas of the second fluidized bed furnace 200 to recycle the fine iron ore particles into the bottom of the second fluidized bed furnace 200, the separated discharge gas of the second fluidized bed furnace 200 being supplied to the first fluidized bed furnace 100 as a reducing gas;

a first intermediate hopper 500 positioned between: the first and second fluidized bed type furnaces 100 and 200, for storing fine iron ore particles (dropped through the holes of a gas distributor 102 of the first fluidized bed type furnace 100) to recycle them into the lower portion of the second fluidized bed type furnace 200; and a second intermediate hopper 600 positioned beneath the second fluidized bed type furnace 200, for storing fine iron ore particles (dropped through the holes of a gas distributor 202 of the second fluidized bed type furnace 200) to recycle them into the lower portion of the second fluidized bed type furnace 200.

The first fluidized bed type furnace 100 includes a lower tapered portion 100a and an upper cylindrical portion 100b. Further, a first gas supply hole 101 is formed on the lower portion of the furnace 100a, for receiving a reducing gas, and within the lower portion of the furnace 100a, there is installed a first gas distributor 102. Further, a first iron ore discharge hole 106 is formed on the side wall of the tapered portion, and the first iron ore discharge hole 106 communicates through a second pipe 103 to the lower portion of the second fluidized bed type furnace 200.

Further, an iron ore supply hole 105 is formed on the side wall of the tapered portion 100a, and the iron ore supply hole 105 is connected through a first pipe 701 to a hopper 700 to supply the fine iron ore into the first fluidized bed type furnace 100. Further, a first gas discharge hole 107 is formed on the top of the furnace 100, and this first gas discharge hole 107 communicates through a third pipe 301 to the upper portion of the first cyclone 300.

The first cyclone 300 separates the fine iron ore particles from the discharge gas of the first fluidized bed furnace 100. On the bottom of the first cyclone 300, there is connected a fourth pipe 302 through which the separated fine iron ore particles are circulated back to the lower portion of the first fluidized bed furnace 100. A fifth pipe 303 is connected to the top of the first cyclone 300 which finally exhausts the discharge gas from the first fluidized bed furnace 100.

The fourth pipe 302 is deeply buried into the first fluidized bed type furnace 100 to recycle the separated fine iron ore particles deeply into the first fluidized bed type furnace 100.

The second fluidized bed type furnace 200 includes a lower tapered portion 200a and an upper cylindrical portion 200b. A second gas supply hole 201 is formed on the lower portion of the tapered portion 200a, for receiving a reducing gas, and a gas distributor 202 is disposed in the lower portion of the tapered portion 200a.

A second iron ore discharge hole 206 is formed on the side wall of the tapered portion 200a, and the second iron ore discharge hole 206 communicates through an eighth pipe 203 into the melter-gasifier 800.

Further, a pre-reduced iron ore supply hole 205 is formed on the side wall of the tapered portion 200a, and the pre-reduced iron ore supply hole 205 is connected through the second pipe 103 to the first fluidized bed type furnace 100 to receive the dried, pre-heated and pre-reduced iron ore into the second fluidized bed type furnace 200. A second gas discharge hole 207 is formed on the top of the furnace 200, and this second gas discharge hole 207 communicates through a 10th pipe 401 to the second cyclone 400.

The second cyclone 400 separates the fine iron ore particles from the discharge gas of the second fluidized bed type furnace 200. A 9th pipe 402 is connected from the bottom of the second cyclone 400 to the lower portion of the furnace 200, for circulating the separated fine iron ore particles into the furnace 200. A 6th pipe 403 is connected to the top of the second cyclone 400, for supplying the discharge gas of the second fluidized bed type furnace 200 to the first fluidized bed type furnace 100.

The 9th pipe 402 should be preferably buried deeply into the second fluidized bed type furnace 200 to recycle the separated fine iron ore particles deeply into its interior.

The first intermediate hopper 500 is disposed between the first fluidized bed type furnace 100 and the second fluidized bed type furnace 200. The hopper 500 is connected through a seventh pipe 502 to the bottom of the first fluidized bed type furnace 100, and is connected through an 11th pipe 504 into the second fluidized bed type furnace 200.

On the 7th pipe 502 and the 11th pipe 504, there are installed one or more of gas/solid sealing type high temperature valves 501 and 503. In this way, during an emergency situation such as a sudden stop of operation or the like, the fine iron ore particles which have been dropped through the holes of the gas distributor 102 of the first fluidized bed type furnace 100 can be temporarily stored, and then transported by an inactive gas such as nitrogen into the second fluidized bed type furnace 200.

The 11th pipe 504 should be preferably deeply buried into the second fluidized bed type furnace 200, and thus, the fine iron ore particles which have been dropped through the holes of the gas distributor 102 of the first fluidized bed type furnace 100 can be recycled deeply into the second fluidized bed type furnace 200.

The second intermediate hopper 600 is disposed beneath the second fluidized bed type furnace 200, and is connected through a 13th pipe 602 to the bottom of the second fluidized bed type furnace 200, while the hopper 600 is connected through a 12th pipe 604 to the lower portion of the second fluidized bed type furnace 200.

On the 13th pipe 602 and the 12th pipe 604 (i.e., upstream and downstream of the hopper 600), there are installed one or more gas/solid sealing type high temperature valves 601 and 603. In this way, during an emergency situation such as a sudden stop of operation or the like, the fine iron ore particles which have been dropped through the holes of the gas distributor 202 of the second fluidized bed type furnace 200 can be temporarily stored, and then transported by an inactive gas such as nitrogen into the second fluidized bed type furnace 200.

Now the method for reducing a fine iron ore by using the above described reducing apparatus will be described.

A fine iron ore which is supplied to the first fluidized bed type furnace 100 is pre-heated and pre-reduced by using a discharge gas (reducing gas) of the second fluidized bed type furnace 200, while forming a bubbling or turbulent fluidized bed. The iron ore thus reacted is transferred through a second pipe 103 to the lower portion of the second fluidized bed type furnace 200. Then a final reduction occurs within the second fluidized bed type furnace 200 by forming a bubbling fluidized bed by using a discharge gas (a discharge gas of the melter-gasifier) which is supplied through the second gas supply hole 201. The finally reduced iron is discharged through the second iron ore discharge hole 206. The fine iron ore particles which are entrained in the discharge gas of the first fluidized bed type furnace 100 are separated from the gas by the first cyclone 300 to be circulated back to the lower portion of the first fluidized bed type furnace 100. The fine iron ore particles which are entrained in the discharge gas of the second fluidized bed type furnace 200 are separated from the gas by the second cyclone 400 to be circulated back to the lower portion of the second fluidized bed type furnace 200.

In the present invention, if an abnormality such as defluidizing or channelling occurs during the operation of the fluidized bed type furnaces, the fine iron ore particles drop through the holes of the gas distributor to impede the flow of the reducing gas. Therefore, periodically during the operation and at an emergency such as the blocking of the reducing gas, first the high temperature valves 501 and 601 (upstream of the first and second intermediate hoppers 500 and 600) are opened. Thus the fine iron ores which are accumulated beneath the gas distributors of the first and second fluidized bed type furnaces 100 and 200 are transferred to the first and second intermediate hoppers 500 and 600, respectively, to be stored there. Then the upstream valves 501 and 601 are closed, and the valves 503 and 603 (downstream of the first and second intermediate hoppers 500 and 600) are opened. Then an inactive gas such as nitrogen is injected to circulate back the stored iron ore into the second fluidized bed type furnace 200.

When the 2-stage fluidized bed type reducing furnace is used to reduce a fine iron ore, the pre-heating and the pre-reducing within the first fluidized bed type furnace 100 should be carried out preferably at 700–850° C., and the final reaction within the second fluidized bed type furnace 200 should be carried out preferably at 750–900° C. The operating pressure should be preferably 1–5 atmospheres in the absolute pressure. The superficial gas velocity right above the gas distributors within the first and second fluidized bed type furnaces 100 and 200 should be preferably 1.2–2.5 times as fast as the minimum fluidization velocity of the fine iron ore staying within the furnaces, in view of the efficient fluidizing and the elutriation loss of the iron ore particles. The angle of the tapered portions should be preferably 5–20° C. relative to the vertical line. The height of the tapered portions 100a and 200a above the gas distributors should be preferably 5–10 times as large as the diameter of the gas distributors. The height of the cylindrical portions 100b and 200b should be preferably 3–5 times as large as their own inner diameter.

Now the present invention will be described in detail based on an actual example.

EXAMPLE

A reduction of a fine iron ore was carried out by using a reducing apparatus having a size as shown in Table 1 and at conditions set forth in Tables 2 to 4.

TABLE 1

| Height and ID of fluidized bed type furnace | |
|---|---|
| First fluidized bed type furnace | ID of tapered portion (at the surface of gas distributor): 0.6 m<br>Angle of tapered portion: 5°<br>Height of tapered portion (from gas distributor): 3 m<br>ID of cylindrical portion: 1.1 m<br>Height of cylindrical portion: 3.5 m |
| Second fluidized bed type furnace | ID of tapered portion (at the surface of gas distributor): 0.6 m<br>Angle of tapered portion: 5°<br>Height of tapered portion (from gas distributor): 3 m |

TABLE 1-continued

Height and ID of fluidized bed type furnace

ID of cylindrical portion: 1.1 m
Height of cylindrical portion: 3.5 m

TABLE 2

Chemical composition and particle size distribution of the iron ore

| | |
|---|---|
| 1. Chemical composition: | 62.17 of T.Fe, |
| | 0.51 of FeO, |
| | 5.5 of $SiO_2$, |
| | 0.11 of $TiO_2$, |
| | 0.05 of Mn, 0.012 of S, |
| | 0.65 of P, |
| | 2.32 of moisture |
| 2. particle size distribution: | 4.6% of −0.05 mm, |
| | 5.4% of 0.05–0.15 mm, |
| | 16.8% of 0.15–0.5 mm, |
| | 59.4% of 0.5–4.75 mm, |
| | 13.8% of 4.75–8 mm |

TABLE 3

Ingredients, temperature and pressure of reducing gas

| | |
|---|---|
| 1. Gas ingredients: | 65% of CO, 25% of $H_2$, 5% of $CO_2$, 5% of $N_2$ |
| 2. Temperature: | 800° C. for pre-heating and pre-reducing |
| | 850° C. for final reduction |
| 3. Pressure: | 1.8 Kgf/cm² for pre-heating and pre-reducing |
| | 2.0 Kgf/cm² for final reduction |

TABLE 4

Superficial Gas velocity in fluidized bed type furnace

| | |
|---|---|
| First fluidized bed type furnace | Velocity at the surface of gas distributor: 1.4 m/s |
| | Velocity in cylindrical portion (superficial velocity): 0.4 m/s |
| Second fluidized bed type furnace | Velocity at the surface of gas distributor: 1.4 m/s |
| | Velocity in cylindrical portion (superficial velocity): 0.4 m/s |

After reducing the fine iron ore by using the above specified apparatus and at conditions set forth in the above tables, the average gas utilization degree and the gas consumption rate were evaluated. The result showed that the gas utilization degree was about 30–35%, and the gas consumption rate was 1200–1500 Nm³/ton-ore. Further, the reduction rates of the reduced irons which were discharged through the first and second discharge holes were respectively 30–40% and 85–95%. The iron ore discharge was possible after 60 minutes from feeding the iron ore through the hopper. This shows that the reducing speed is very excellent.

According to the present invention as described above, intermediate hoppers and gas/solid sealing valves are installed beneath the fluidized bed type furnaces. Thus the fine iron ore particles which drop through the holes of the gas distributors during an abnormality of operation can be circulated back to the fluidized bed type furnaces. Therefore, the flow of the reducing gas is never impeded, and therefore, the operation can be carried out for a long time without a halt.

Further, with only the 2-stage process, the present invention ensures a sufficient reduction rate and a superior gas consumption rate, and is not inferior to Korean Patent 117065 (1997). Further, the present invention is superior over Korean Patent 117065 (1997) in the facility cost and the production cost.

Further, in the present invention, a relatively uniformly reduced iron can be obtained regardless of the particle sizes of the iron ore. Further, the discharge amounts and particle sizes can be adjusted for the respective discharge holes, and the reduction rate can be adjusted by controlling the residence time of the iron ore within the furnace.

What is claimed is:

1. A two-stage fluidized bed apparatus for drying, pre-heating and pre-reducing a fine iron ore in a first fluidized bed furnace, and for finally reducing the pre-reduced fine iron ore in a second fluidized bed furnace, comprising:

a first tapered fluidized bed furnace for receiving a raw fine iron ore from a hopper through a first gas supply hole and for receiving a reducing gas to form a turbulent or bubbling fluidized bed so as to pre-heat and pre-reduce the raw iron ore and so as to discharge the fine iron ore thus pre-reduced through a first ore discharge hole;

a first cyclone for separating fine iron ore particles from a discharge gas of said first fluidized bed furnace to recycle the fine iron ore particles thus separated into said first fluidized bed furnace;

a second fluidized bed furnace for finally reducing the pre-heated and pre-reduced fine iron ore of said first fluidized bed furnace, by forming a bubbling or turbulent fluidized bed by utilizing a discharge gas supplied from a melter-gasifier through a second gas supply hole, a finally reduced iron being discharged through a second iron ore discharge hole;

a second cyclone for separating fine iron ore particles from a discharge gas of said second fluidized bed furnace to recycle the fine iron ore particles thus separated into a bottom of said second fluidized bed furnace;

a first intermediate hopper positioned between said first and second fluidized bed furnaces, for storing fine iron ore particles, which have been dropped through holes of a gas distributor of said first fluidized bed furnace, to recycle them into a lower portion of said second fluidized bed furnace;

a second intermediate hopper positioned beneath said second fluidized bed furnace, for storing fine iron ore particles, which have been dropped through holes of a gas distributor of said second fluidized bed furnace to recycle them into a lower portion of said second fluidized bed furnace;

said first ore discharge hole communicating by way of a pipe with said pre-reduced iron ore supply hole;

said first gas discharge hole communicating by way of a pipe with an upper portion of said first cyclone, and said first cyclone being connected by way of a pipe with said first tapered fluidized bed furnace;

said second cyclone being connected by way of a pipe with a top of said second fluidized bed furnace, connected by way of a pipe with a lower portion of said second fluidized bed furnace, and connected by way of a pipe with a lower portion of said first fluidized bed furnace;

said first intermediate hopper being connected by way of a pipe with a lower portion of said first fluidized bed furnace, and connected by way of a pipe with an interior of said second fluidized bed furnace; and said second intermediate hopper being connected by way of a pipe with a bottom of said second fluidized bed furnace, and connected by way of a pipe with a lower portion of said second fluidized bed furnace.

2. The two-stage fluidized bed fine iron ore reducing apparatus as claimed in claim 1, wherein:

a discharge end of said pipes connecting said first and second cyclones with the respective first and second fluidized bed furnaces are deeply buried into a lower portion of said respective first and second fluidized bed furnaces to recycle the fine iron ore particles, which have been dropped through holes of said gas distributor, deeply into the lower portion of said respective first and second fluidized bed furnaces.

3. The two-stage fluidized bed fine iron ore reducing apparatus as claimed in claim 1, wherein selected pipes in the apparatus are respectively provided with gas/solid sealing high temperature valves.

4. The two-stage fluidized bed fine iron ore reducing apparatus as claimed in claim 1, wherein said first fluidized bed furnace and said second fluidized bed furnace respectively comprise a tapered portion and a cylindrical portion; wherein said tapered portion has an inclination angle of 5–20° C. relative to a vertical line; said tapered portion has a height above said gas distributor which is 5–10 times as large as a diameter of said gas distributor; and said cylindrical portion has a height 3–5 times as large as its inside diameter.

5. The two-stage fluidized bed fine iron ore reducing apparatus as claimed in claim 1, wherein said first fluidized bed furnace and said second fluidized bed furnace respectively comprise a tapered portion and a cylindrical portion; wherein said tapered portion has an inclination angle of 5–20° C. relative to a vertical line; said tapered portion has height above said gas distributor which is 5–10 times as large as a diameter of said gas distributor; and said cylindrical portion has a height 3–5 times as large as its inside diameter.

6. A method for reducing a fine iron ore by using a two-stage fluidized bed apparatus for drying, pre-heating and pre-reducing a fine iron ore in a first fluidized bed furnace, and for finally reducing the pre-reduced fine iron ore in a second fluidized bed furnace, comprising the steps of:

drying, pre-heating and pre-reducing a fed fine iron ore within a first fluidized bed furnace while forming a bubbling or turbulent fluidized bed by utilizing a discharge gas from a second fluidized bed furnace, transferring the pre-reduced fine iron ore through a pipe to a lower portion of said second fluidized bed furnace, and finally reducing the iron ore by forming a bubbling fluidized layer by utilizing a reducing gas supplied from a melter-gasifier through a discharge gas supply hole;

separating extremely fine iron ore particles from a discharge gas of said first fluidized bed furnace by a first cyclone to circulate back the separated fine iron ore particles to a lower portion of said first fluidized bed furnace, and separating extremely fine iron ore particles from a discharge gas of said second fluidized bed furnace by a second cyclone to circulate back the separated fine iron ore particles to a lower portion of said second fluidized bed furnace; and opening upstream high temperature valves of first and second intermediate hoppers at an emergency situation to store accumulated fine iron ore particles in said first and second intermediate hoppers, then closing said upstream high temperature valves and opening downstream high temperature valves of said first and second intermediate hoppers, and injecting an inactive gas to transfer the fine iron ore particles to a lower portion of said second fluidized bed furnace.

7. The method as claimed in claim 6, wherein a gas flow velocity just above said gas distributors of said first and second fluidized bed furnaces is 1.2–2.5 times as fast as a minimum fluidization velocity of the fine iron ore particles staying within said furnaces.

8. The method as claimed in claim 6, wherein a pre-heating and a pre-reducing are carried out within said first fluidized bed furnace at a temperature of 700°–850° C., a final reduction is carried out within said second fluidized bed furnace at a temperature of 750–900° C., and an operating pressure of 1–5 atmospheres in absolute pressure is applied to the respective furnaces.

9. The two-stage fluidized bed fine iron ore reducing apparatus as claimed in claim 2, wherein selected pipes in the apparatus are respectively provided with gas/solid sealing high temperature valves.

10. The two-stage fluidized bed fine iron ore reducing apparatus as claimed in claim 2, wherein said first fluidized bed furnace and said second fluidized bed furnace respectively comprise a tapered portion and a cylindrical portion; wherein said tapered portion has an inclination angle of 5–20° C. relative to a vertical line; said tapered portion has a height above said gas distributor which is 5–10 times as large as a diameter of said gas distributor; and said cylindrical portion has a height 3–5 times as large as its inside diameter.

11. The two-stage fluidized bed fine iron ore reducing apparatus as claimed in claim 9, wherein said first fluidized bed furnace and said second fluidized bed furnace respectively comprise a tapered portion and a cylindrical portion; wherein said tapered portion has an inclination angle of 5–20° C. relative to a vertical line; said tapered portion has a height above said gas distributor which is 5–10 times as large as a diameter of said gas distributor; and said cylindrical portion has a height 3–5 times as large as its inside diameter.

12. The two-stage fluidized bed fine iron ore reducing apparatus as claimed in claim 7, wherein selected pipes in the apparatus are respectively provided with gas/solid sealing high temperature valves.

* * * * *

UNITED STATES PATENT AND TRADEMARK OFFICE
CERTIFICATE OF CORRECTION

PATENT NO.     : 6,491,738 B1
DATED          : December 10, 2002
INVENTOR(S)    : Il Ock Lee et al.

It is certified that error appears in the above-identified patent and that said Letters Patent is hereby corrected as shown below:

<u>Title page, Item [54] and Column 1, line 1,</u>
Title, delete "TYPE".

<u>Column 4,</u>
Line 8, delete colon (:) between the text "between" and "the".

Signed and Sealed this

First Day of July, 2003

JAMES E. ROGAN
*Director of the United States Patent and Trademark Office*